Oct. 7, 1947.   M. STISCHER   2,428,688
CHUCK
Filed Oct. 19, 1943

Morris Stischer INVENTOR.

BY
Victor J. Evans & Co.
ATTORNEYS

Patented Oct. 7, 1947

2,428,688

UNITED STATES PATENT OFFICE 2,428,688

CHUCK

Morris Stischer, San Antonio, Tex.

Application October 19, 1943, Serial No. 506,877

3 Claims. (Cl. 279—67)

My invention relates to chucks, and has among its objects and advantages the provision of an improved chuck embodying novel structure facilitating handling of work of variable sizes.

Figure 1:
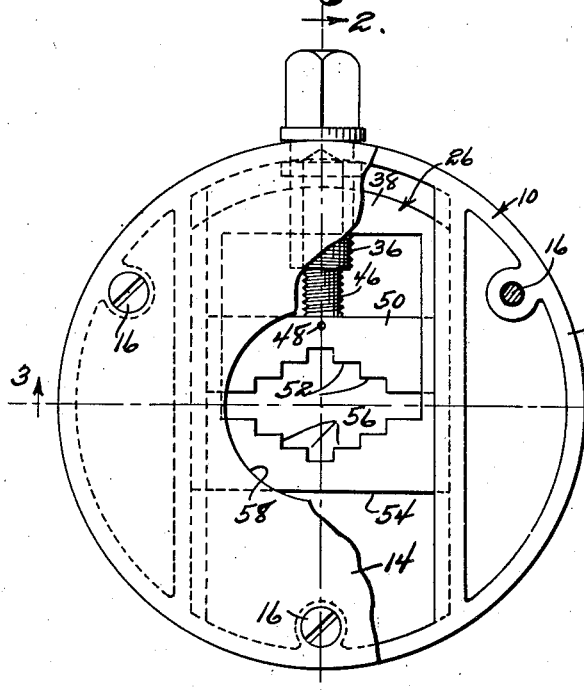
Figure 1 is a face view partly in section of a chuck in accordance with my invention.
Figure 2:
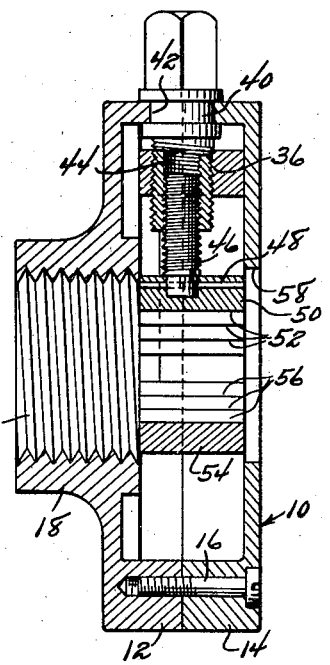
Figure 2 is a sectional view along the line 2—2 of Figure 1.
Figure 3:
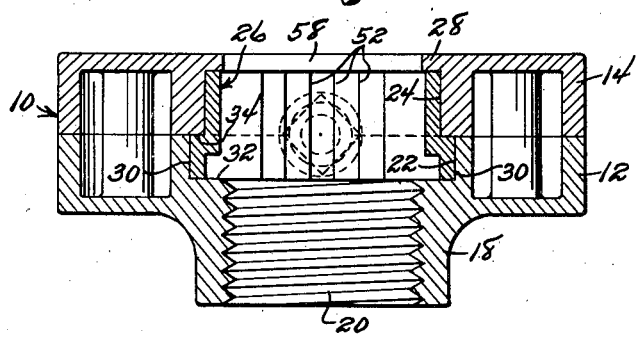
Figure 3 is a sectional view along the line 3—3 of Figure 1.

In the embodiment of the invention selected for illustration, I make use of a shell or frame 10, comprising two parts 12 and 14. The rear part or section 12 and the front part of section 14 are secured into a unitary structure by bolts 16. The part 12 is provided with a boss 18 having a threaded opening 20 for connection with a suitable support or for mounting in a lathe.

The sections 12 and 14 are provided with parallel guide ribs or faces 22 and 24 for slidably guiding an open frame or yoke 26. This yoke has its front side abutting the front wall 28 of the section 14, and the yoke is provided at its rear side with outwardly offset ribs 30 located between the face 32 of the section 12 and the shoulders 34 formed by offsetting the guide ribs 24 inwardly of the guide ribs 22. The lateral sides of the frame or yoke 26 contact with the inner faces of the guide ribs 22 and 24. The yoke 26 slides freely relatively to the sections 12 and 14 but is guided against lateral relative shifting.

A right hand screw 36 is threaded through the end 38 of the yoke 26. This screw is provided with an annular groove 40 located in a close fitting opening 42 in the side sections 12 and 14 so that the screw is rotatably supported but restrained from relative axial movement. This screw is provided with an internally threaded bore 44 for the reception of a left hand screw 46 keyed at 48 to a jaw 50 provided with teeth 52. The end 54 of the yoke 26 is also provided with teeth 56 identical with the teeth 52 and arranged in opposing relationship therewith.

My chuck is designed to afford a tight grip on pipes and the like being threaded with less slippage. Right hand rotation of the screw 36 will cause the jaws of the chuck to close, and a left hand turn will cause the jaws to move apart, the relative movement being at the same speed and the two jaws spaced equidistant from the center at all times. The two screws 36 and 46 have threads of the same pitch. The wall 28 is provided with a work receiving opening 58.

Without further elaboration, the foregoing will so fully explain my invention, that others may, by applying current knowledge, readily adapt the same for use under various conditions of service.

I claim:

1. In a chuck of the type having a sectional annular frame, one section of which is threaded to be connected with a support for mounting in a lathe, and the other section being provided with a work receiving opening, parallel guide faces formed in the sections, a yoke slidable on the guide faces in the sections and having a jaw, a right hand operating screw threaded into the yoke and rotatably retained in the frame, said screw having an internally threaded bore to receive a left handed screw, a jaw opposing the jaw of the yoke and keyed to the second named screw whereby said yoke and the jaw thereon and the jaw are moved in opposite directions in the same amount through rotation of the first screw.

2. In a chuck of the type described having a sectional annular frame, one section threaded to be connected with a support for mounting in a lathe, the other section provided with a work receiving opening, parallel guide faces formed in the sections on opposite sides of the work receiving opening, a yoke slidable on the guide faces in the sections and having an inner jaw face at one end thereof, a screw rotatably mounted in the frame and having a right hand threaded connection with the end of the yoke opposite the jaw face, said screw having an internally threaded bore, a left hand screw in said threaded bore, a jaw sliding in said yoke and having a jaw face facing the jaw face of the yoke and rigidly connected to the lower end of the left hand threaded screw.

3. A chuck comprising a shell provided in its front wall with a work receiving opening and on its rear wall with a screw threaded boss, the shell consisting of front and rear sections detachably connected together, parallel guide ribs within each of the shell sections at opposite sides of the work receiving opening, the guide ribs of the front shell section extending inwardly beyond the guide ribs of the rear shell section to provide rearwardly facing shoulders, an open frame slidable within the shell with its lateral sides in contact with the guide ribs and its front side in contact with the front wall of the shell, the frame being provided at its rear side with outwardly offset ribs contacting with the rearwardly facing shoulder and the rear wall of the shell and the guide ribs of the rear shell section, one end of the frame constituting a jaw, a second jaw slidable within the frame with relation to the first jaw, a screw fixed to and extending from the other end of the frame, a hollow screw rotatably carried by the lateral wall of the shell and having screw threaded engagement with said other end of the frame and said first screw whereby upon operation to effect the movement of the frame and movable jaw in opposite directions.

MORRIS STISCHER.

REFERENCES CITED

The following references are of record in the file of this patent:

UNITED STATES PATENTS

| Number | Name | Date |
|---|---|---|
| 2,100,034 | Leonard | Feb. 11, 1937 |
| 50,593 | Jackson | Oct. 24, 1865 |
| 1,058,625 | Pepper | Apr. 8, 1913 |

FOREIGN PATENTS

| Number | Country | Date |
|---|---|---|
| 446,072 | France | Sept. 22, 1911 |